May 20, 1969
C. AKMENTIN
3,444,823
SUSPENDED WHEELED VEHICLE HAVING AUXILIARY AIR
CUSHION AND AIRFOIL RUNNING GEAR
Filed Nov. 15, 1966
Sheet 1 of 2
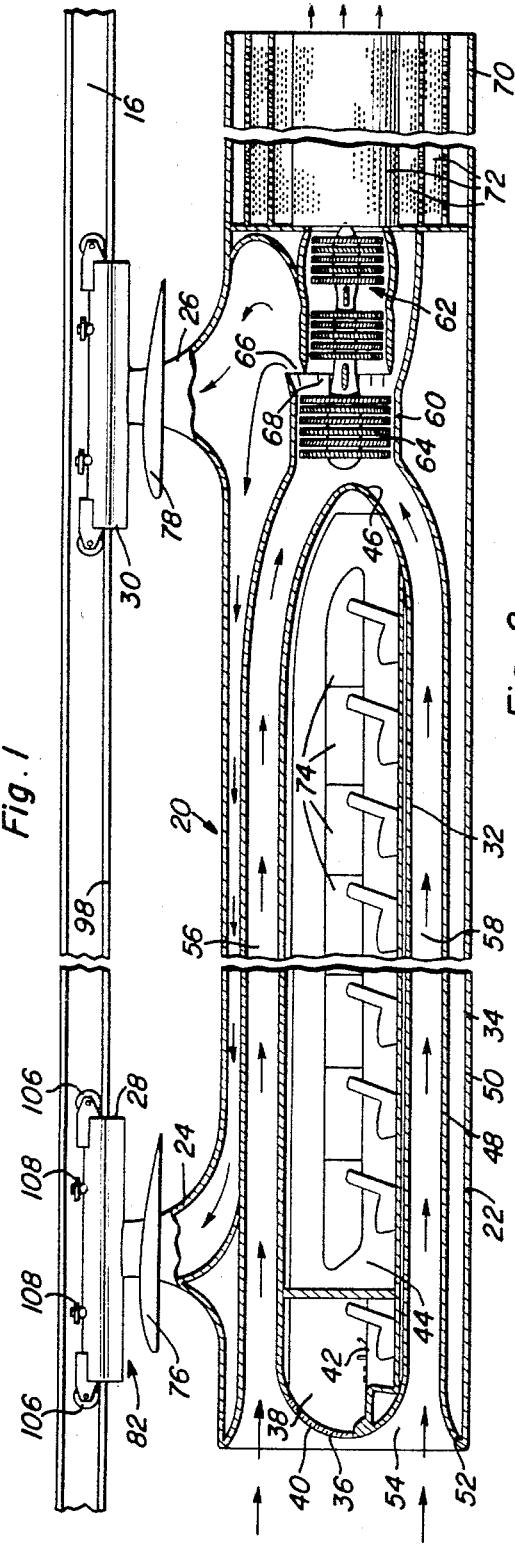
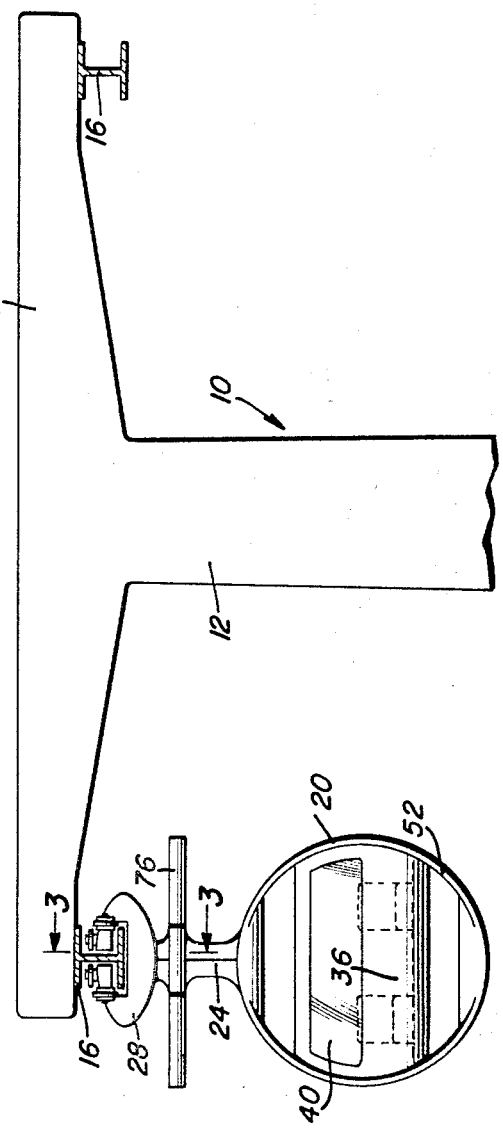
Cyril Akmentin
*INVENTOR.*

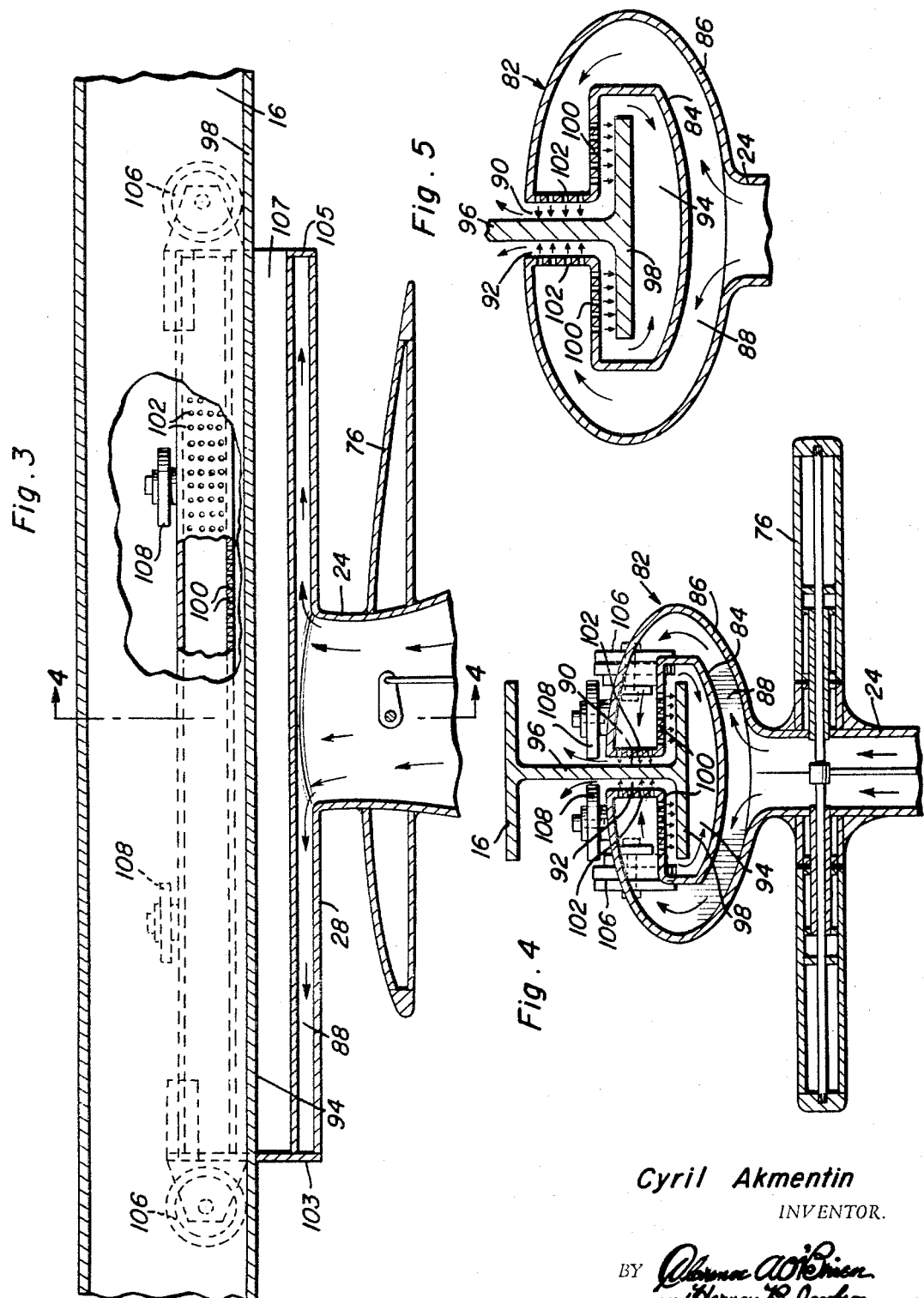

United States Patent Office 3,444,823
Patented May 20, 1969

3,444,823
SUSPENDED WHEELED VEHICLE HAVING AUXILIARY AIR CUSHION AND AIRFOIL RUNNING GEAR
Cyril Akmentin, 136 Minnechaug Drive,
Glastonbury, Conn. 06033
Filed Nov. 15, 1966, Ser. No. 594,576
Int. Cl. B60v *3/04;* B61c *11/06;* B61b *13/04*
U.S. Cl. 105—64                                    9 Claims

ABSTRACT OF THE DISCLOSURE

This disclosure pertains to a suspended vehicle including a jet engine providing the motive force for the vehicle and including the usual air compressing stage from which quantities of air under pressure are bled and utilized to support the weight of the vehicle from its supporting monorail structure by means of an air cushion, movement of the vehicle along its supporting rail structure being guided by more positive means but also assisted by said air cushion.

---

This invention relates to a novel and useful monorail vehicle including novel means for suspending the vehicle for movement along a supporting monorail structure, for propelling the monorail vehicle along the supporting monorail structure, for at least partially supporting the monorail vehicle by means of an attached airfoil, and for providing an air cushion operable to cushion the ride of the monorail vehicle along its supporting monorail structure by utilizing a portion of the air compressed by the compressor stage of a jet engine, preferably of a turbofan type, carried by the monorail vehicle and utilized to propel the monorail vehicle along its supporting monorail structure.

The main object of this invention is to provide an improved monorail vehicle for movement along a monorail structure and including a jet engine for propelling the vehicle forwardly including novel air intake means constructed in a manner whereby air resistance to forward movement of the monorail vehicle at high speeds will be maintained at a minimum.

Another object of this invention is to provide a monorail vehicle including airfoil means adapted to provide support for at least a major portion of the weight of the monorail vehicle during its movement at high speeds along its supporting monorail structure.

Yet another object of this invention is to provide a monorail vehicle including follower means guidingly engaged with its supporting monorail structure and provided with air cushioning means for cushioning the ride of the vehicle along the monorail structure and receiving its supply of air under pressure from the compressor section of the jet engine utilized to propel the monorail vehicle.

A final object of this invention to be specifically enumerated herein is to provide a monorail vehicle and supporting monorail structure therefor which will conform to conventional forms of manufacture, be of simple construction and efficient in operation so as to provide a device that will be economically feasible, long lasting and adaptable to various environments.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a section of a monorail beam with the monorail vehicle of the instant invention operatively supported therefrom for movement therealong and portions of the monorail vehicle being broken away and illustrated in longitudinal vertical section;

FIGURE 2 is a transverse vertical sectional view taken upon a plane extending transversely through the vehicle monorail supporting structure and illustrating the manner in which the monorail vehicle is suspended from the corresponding monorail beam;

FIGURE 2 is a transverse vertical sectional view taken vertical sectional view taken substantially upon a plane designated by the section line 3—3 of FIGURE 2;

FIGURE 4 is a fragmentary transverse sectional view taken substantially upon the plane indicated by the section line 4—4 of FIGURE 3; and FIGURE 5 is a fragmentary transverse vertical sectional view similar to that of FIGURE 3 but on a somewhat enlarged scale and more clearly illustrating the means by which the monorail vehicle is cushioned for travel along the monorail vehicle supporting structure by compressed air ducted from the compressor section of the propelling jet engine of the monorail vehicle.

Referring now more specifically to the drawings and to FIGURES 1 and 2 in particular, the numeral 10 generally designates a monorail support structure including a plurality of upright standards 12 provided with transverse crossarms 14 at their upper ends. The standards 12 are disposed in horizontally spaced relation along the intended path of movement of the associated monorail vehicle and a pair of monorail vehicle supporting I-beams 16 are carried by and extend between corresponding end portions of the crossarms 14.

The monorail vehicle of the instant invention is generally referred to by the reference numeral 20 and includes a main elongated body portion 22 provided with front and rear upstanding support arms 24 and 26 including a pair of elongated follower or carriage assemblies 28 and 30, respectively, at their upper ends guidingly engaged with the corresponding beam 16 for movement therealong.

The body portion 22 includes a center elongated passenger cabin 32 supported within a sleeve member 34 defining the main outer structure of the body portion 22. The forward end of the passenger cabin 32 is rounded as at 36 and defines an operator's compartment 38 complete with windshield 40 and suitable operating controls 42. The rear portion of the passenger cabin 32 defines a passenger compartment 44 and the rear end of the passenger cabin 32 tapers to a smooth rounded point as at 46.

The outer sleeve member 34 of the body portion 22 includes inner and outer wall portions 48 and 50 joined together as at 52 at their forward ends and forming a flaired mouth or air inlet 54 at the forward end of the body portion 22. The passenger cabin 32 is rigidly supported between opposite side portions of the inner wall portion 48 and is vertically spaced below and above the upper and lower portions of the inner wall portion 48 so as to define a pair of upper and lower air inlet passages 56 and 58. The rear end of the inner wall portion 48 tapers as at 60 and has a jet engine generally referred to by the reference numeral 62 supported from the inner portions thereof. The jet engine 62 is provided with an air compressing section 64 including a compressed air bleed opening 66 provided with adjustable shutters 68 disposed immediately rearwardly of the air compressor section 64 whereby a varied proportion of the air compressed by the air compressor section 64 may be bled off.

The opening 66 opens into the space between the inner and outer wall portions 48 and 50 and the support arms 24 and 26 are hollow and define air passages extending upwardly therethrough whose lower ends are communicated with the area defined between the inner and outer wall portions 48 and 50. In this manner, the air bleed opening 66 is in direct communication with the passages defined by the support arms 24 and 26.

The rear end of the body portion 22 defines a large jet exhaust outlet 70 and includes a plurality of apertured or foraminated concentric axially extending sleeves 72 acting as jet exhaust silencers. Further, the opposite side wall portions of the passenger compartment 44 include windows 74 which open outwardly through the outer wall portion 50 and thereby provide the passengers within the passenger compartment 44 a view of the area through which the monorail vehicle 20 is moving.

The support arms 24 and 26 include stub airfoils 76 and 78 which are generally horizontally disposed and extend transversely of the vehicle 10. These airfoils 76 and 78 include angularly adjustable opposite end portions independently adjustable about transverse horizontal axes and serve to provide at least partial lift for the monorail vehicle 20 when the latter is moving along its supporting beam 16 at high speeds.

With attention now invited more specifically to FIGURES 3-5 of the drawings each of the follower or carriage assemblies 28 and 30 defines an elongated tubular member generally referred to by the reference numeral 82 including inner and outer wall portions 84 and 86. The outer wall portions 84 define continuations of the support arms 24 and 26 and therefore the spacing or generally tubular area 88 between the inner and outer wall portions 84 and 86 is communicated with the interior of the support arms 24 and 26 and therefore also the opening 66 whereby compressed air bled from the compressor section 64 may be pumped into the tubular area 88.

Each of the tubular members 82 defines a generally inverted T-shaped guideway or slot 90 including a vertical leg 92 and a transversely enlarged lower portion 94. The slot 90 extends longitudinally through each of the follower assemblies 28 and 30 and embracingly receives therein the lower portion of the web 96 of the corresponding beam 16 and also the lower horizontal flange portion 98 of the beam 16. The inner wall portions 84 include a plurality of small vertically extending apertures 100 and a plurality of similar horizontally extending apertures 102 whereby air pumped into the tubular area 88 from the compressor section 16 may be pumped outwardly of the apertures 100 and directed down upon the upper surface of the lower flange 98 of the beam 16 and out of the apertures 102 toward the remote side surfaces of the lower portion of the web 96. In this manner, the air being discharged through the apertures 100 and striking the upper surfaces of the lower flange 98 will effect an upward thrust upon the monorail vehicle 20 to support a portion of its weight by means of the air cushion formed by the air being pumped through the apertures 100. In addition, the air being pumped through the apertures 102 will of course tend to center the web 96 in the vertical leg 92 of the slot 90, the front and rear ends of the tubular area 88 being closed as at 103 and 105 and the rear end of the lower portion 94 being open as at 107.

Accordingly, not only will the airfoil members 76 and 78 provide some lift for the monorail vehicle 20, but the air being discharged through the apertures 100 will also provide some lift for the monorail vehicle 20.

Each of the tubular members 82 includes pairs of opposite side front and rear vertical flanged rollers 106 journaled for rotation about transverse axes and front and rear pairs of opposite side rollers 108 journaled for rotation about vertical axes. The flanged rollers 106 are adapted to roll along the upper surface of the lower flange 98 and to thereby rollingly support the monorail vehicle 20 from the beam 16. In addition, the rollers 108 are provided to rollingly engage the opposite side surfaces of the web 96 whenever there is a tendency for the monorail vehicle 20 to be slightly laterally displaced relative to the beam 16. Of course, during normal operation of the monorail vehicle 20, the rollers 106 and 108 will not be in contact with the beam 16 due to the air being discharged through the apertures 100 and 102 and the partial lift provided by the air foil members 76 and 78.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the invention as claimed.

What is claimed as new is as follows:

1. An elongated vehicle including a longitudinally extending body portion defining a tubular outer sleeve and an elongated passenger cabin disposed within said sleeve, said passenger cabin including longitudinally spaced opposite side window assemblies opening through corresponding portions of the upstanding opposite side walls of said outer sleeve, said outer sleeve including generally horizontal upper and lower inner surface portions and said passenger cabin including upper and lower generally horizontal outer surface portions spaced below and above an opposing said inner surface portions, respectively, said opposing spaced upper and lower surface portions defining upper and lower air passages therebetween within the confines of said outer sleeve, said sleeve extending rearwardly beyond the rear end of said cabin and said passages merging together rearward of said cabin to form a central rearwardly extending air passage opening rearwardly from the rear end of said body portion, and air pump means operatively associated with said central air passage for pumping air rearwardly therethrough.

2. The combination of claim 1 wherein said vehicle comprises a monorail vehicle including follower means adapted to dependingly support opposite end portions of said vehicle from a monorail for rapid movement of said vehicle along said monorail.

3. The combination of claim 2 wherein said body portion includes horizontally disposed stub wing members at opposite end portions thereof adapted to at least partially support the weight of said vehicle when the latter is moving along said monorail at high speed.

4. The combination of claim 3 wherein means adapted to dependingly support the opposite ends of said vehicle include means adapted to define a lowermost position of said vehicle relative to said monorail during movement of said vehicle along said monorail and to provide for limited upward movement of said vehicle relative to said monorail from said lowermost position.

5. The combination of claim 2 wherein said means adapted to dependingly support opposite end portions of said vehicle include upstanding support arms carried by the opposite ends of said vehicle, each of said arms including an elongated follower extending longitudinally of said vehicle, each of said followers defining a generally inverted T-shaped passage extending therethrough including a generally vertical leg opening upwardly through the corresponding follower and terminating at its lower end in a horizontal leg projecting outwardly from opposite sides of said vertical leg, said passage being adapted to slidingly receive therethrough at least the lower portion of a vertical web portion of an elongated monorail and a lower horizontal flange portion of said monorail carried by the lower marginal portion of said web portion with the upper walls of the opposite side portions of said horizontal leg overlying the upper surfaces of the opposite side portions of said horizontal flange portion in closely spaced relation therewith and the undersurface of said horizontal flange portion spaced above the bottom wall of said horizontal leg, said followers each including, at their opposite ends, wheel means adapted for rolling engagement with said upper surfaces and wheel means adapted for rolling engagement with the opposite side surfaces of said web portions.

6. The combination of claim 2 wherein said means adapted to dependingly support the opposite ends of said vehicle include upstanding support arms carried by the opposite ends of said vehicle, said support arms including support wheel means journaled for rotation about generally horizontally disposed axes extending transversely of said body and adapted to rollingly engage and support said vehicle from upwardly facing support surface means defined by said monorail, said support arms including means defining pressure chamber means including a bottom wall adapted to closely overlie said support surface means and having a plurality of air outlet openings formed therein, said air pump means defining a source of air under pressure, and means communicating a portion of the discharge of said air pump means with the interior of said pressure chamber means.

7. The combination of claim 6 wherein said air pump means comprises a jet engine including an air compressing section comprising disposed in said central passage.

8. An elongated monorail vehicle including follower means adapted to dependingly support opposite end portions of said vehicle from a monorail for rapid movement of said vehicle along said monorail, said vehicle including an elongated body portion including a power source adapted to propel said vehicle along said rail, at high speed, said means adapted to depending support opposite end portions of said vehicle including upstanding support arms carried by the opposite ends of said vehicle, each of said arms including an elongated follower extending longitudinally of said vehicle, each of said followers defining a generally inverted T-shaped passage extending therethrough including a generally vertical leg opening upwardly through the corresponding follower and terminating at its lower end in a horizontal leg projecting outwardly from opposite sides of said vertical leg, said passage being adapted to slidingly receive therethrough at least the lower portion of a vertical web portion of an elongated monorail and a lower horizontal flange portion of said monorail carried by the lower marginal portion of said web portion with the upper walls of the opposite side portions of said horizontal leg overlying the upper surfaces of the opposite side portions of said horizontal flange portion in closely spaced relation therewith and the undersurface of said horizontal flange portion spaced above the bottom wall of said horizontal leg, said followers each including, at their opposite ends, wheel means adapted for rolling engagement with said upper surfaces and wheel means adapted for rolling engagement with the opposite side surfaces of said web portions, said power source comprising a jet engine including an air compressing section comprising said source of air under pressure, said upper walls including compressed air outlet means, said air compressing section including compressed air discharge means communicated with said compressed air outlet means, the latter being adapted to downwardly direct a large number of jets of air under pressure upon said upper surfaces for supporting said vehicle from said monorail independent of said wheel means.

9. The combination of claim 8 wherein the side walls of said channel defining said vertical leg also include compressed air outlet means, said air discharge means also being communicated with the last mentioned air outlet means, the latter being adapted to laterally direct a large number of jets of air under pressure upon said opposite side surface of said web portion.

References Cited

UNITED STATES PATENTS

| 2,864,318 | 12/1958 | Toulmin | 104—23 |
| 3,081,711 | 3/1963 | Davino | 104—95 |
| 3,125,964 | 3/1964 | Silverman | 104—89 |
| 3,225,228 | 12/1965 | Roshala | 310—12 |
| 3,244,113 | 4/1966 | Smyser | 105—150 X |

FOREIGN PATENTS 966,602  3/1950  France.

ARTHUR L. LA POINT, *Primary Examiner.*

HOWARD BELTRAM, *Assistant Examiner.*

U.S. Cl. X.R.

104—23, 89, 95, 134; 105—74, 148, 150, 154